United States Patent [19]

Mason

[11] Patent Number: 5,709,941
[45] Date of Patent: Jan. 20, 1998

[54] PROCESS FOR PREPARING A MOLDING COMPOSITION HAVING IMPROVED FLOWABILITY

[75] Inventor: James P. Mason, McKees Rocks, Pa.

[73] Assignee: Bayer Corporation, Pittsburgh, Pa.

[21] Appl. No.: 743,510

[22] Filed: Nov. 4, 1996

Related U.S. Application Data

[63] Continuation-in-part of Ser. No. 966,237, Oct. 26, 1992, abandoned.

[51] Int. Cl.[6] .................................................... B29B 9/06
[52] U.S. Cl. ........................... 428/364; 264/476; 264/492; 264/143; 428/400
[58] Field of Search ........................ 264/476, 492, 264/462, 143; 428/364, 400

[56] References Cited

U.S. PATENT DOCUMENTS

| | | | |
|---|---|---|---|
| 3,846,522 | 11/1974 | Goldman | 264/25 |
| 3,974,250 | 8/1976 | Cottis et al. | 264/68 |
| 4,067,942 | 1/1978 | Wilson | 264/80 |
| 4,594,204 | 6/1986 | Heidenreich et al. | 264/25 |

*Primary Examiner*—Jeffery R. Thurlow
*Attorney, Agent, or Firm*—Joseph C. Gil; Aron Preis

[57] ABSTRACT

A process for rapidly improving the flowability, in pellet form, of a molding composition is disclosed. Accordingly, the crystalline content of an amorphous or a semi-amorphous version of a crystallizable thermoplastic resin is increased by subjecting the resin to infra-red radiation to an extent which induces the formation of crystals in the irradiated amorphous resin or the increase of the level of crystals in the semi-amorphous irradiated resins. The resin modified by the inventive process is rendered more suitable for processing: in dried, pellet-form, the modified resin is characterized by its improved flowability. An article molded from the thus modified resin exhibits better properties than does a corresponding article made from a unmodified resins which has been subjected to similar drying conditions.

14 Claims, No Drawings

5,709,941

PROCESS FOR PREPARING A MOLDING COMPOSITION HAVING IMPROVED FLOWABILITY

This application is a Continuation-in-Part of application Ser. No. 07/966,237 filed Oct. 26, 1992, now abandoned.

FIELD OF THE INVENTION

The invention concerns processing of thermoplastic molding resins and more particularly, crystallizable resins.

SUMMARY OF THE INVENTION

A process for rapidly improving the flowability, in pellet form, of a molding composition is disclosed. Accordingly, the crystalline content of an amorphous or a semi-amorphous version of a crystallizable thermoplastic resin is increased by subjecting the resin to infra-red radiation to an extent which induces the formation of crystals in the irradiated amorphous resin or the increase of the level of crystals in the semi-amorphous irradiated resins. The resin modified by the inventive process is rendered more suitable for processing: in dried, pellet-form, the modified resin is characterized by its improved flowability. An article molded from the thus modified resin exhibits better properties than does a corresponding article made from an unmodified resin which has been subjected to similar drying conditions.

BACKGROUND OF THE INVENTION

It is well recognized that presence of moisture in the resin often leads to a deterioration of the properties of the article molded therefrom. Drying of the resin is therefore a necessary process step immediately prior to its thermoplastic molding. While high temperature drying is an efficient means for reducing the moisture content of some resins, the high temperature is not conducive for the processing of other resins. It has been the observation of those skilled in the art that upon drying at temperatures above 200° F., molding pellets containing the amorphous (or semi-crystalline) version of crystallizable resin tend to crystallize and agglomerate. As a consequence, the free flowing characteristic of the molding pellets is practically lost. At present, the problem is sometimes addressed by crystallizing the resin in an agitated heater, followed by conventional drying. While agitation helps in preventing sticking and agglomeration of the pellets, it is not time-efficient. Lowered drying temperature as the means to preserve flowability carries the risk that the drying would be incomplete and the residual moisture would degrade the resin during the molding step.

Drying resinous material, the heating provided by exposure to infra-red radiation is known. Also known is the fact that elevated temperatures are conducive for the crystallization of crystallizable resins. Further, the art recognized that crystalline resin, as opposed to amorphous or semi-crystalline resin, will remain flowable even after drying at higher temperature. The relevant patent literature is noted to include U.S. Pat. No. 3,846,522 which disclosed a method for forming a shaped article in a press. The method entails heating a comminuted thermoplastic resin to a temperature slightly below its fusion point and then placing the heated comminuted resin in a mold. Infra-red is among the disclosed means to heat the resin. A method for improving the moldability of paraoxybenzoyl polyesters has been disclosed in U.S. Pat. No. 3,974,250. The method entails heating the resin at a temperature of at least 300° C., up to the decomposition temperature of the polymer followed by the rapid and immediate reduction of the polymer temperature to cause reduction of the crystallinity of the paraoxybenzoyl polyester. Infra-red is among the means said to be suitable for the heating step. In accordance with U.S. Pat. No. 4,067,942, extruded articles of monovinyl-substituted aromatic compound/conjugated diene block copolymer is rendered good clarity upon a brief exposure to a heat source. In accordance with the process thus discloses, the invention necessitates melting a very thin surface layer, leaving the bulk of the thickness of the extrudate uneffected. Infra-red heaters are among the disclosed means. A process for annealing of thermoplastically-shaped plastics parts has been disclosed in U.S. Pat. No. 4,594,204. In accordance with the process, the internal stresses in plastic bottles are reduced within a short period of time by annealing with infra-red radiation.

It is an object of the invention to provide the means for rapid crystallization of an extruded strand of a molding composition which contains a crystallizable resin.

It is an additional object of the present invention to provide a molding composition in pellet form, having an incresed content of crystalline matter.

It is an additional object of the invention to provide a molding composition in pellet form containing a crystallizable resin pellet which pellet is free flowing.

It is a further object of the invention to provide a pellet containing resin which has been substantially crystallized by infra-red heating to render it more suitable to high temperature drying.

DETAILED DESCRIPTION OF THE INVENTION

The objects of the invention are attained by heating by infra-red radiation (IR) a molding composition in the form of an extruded strand, the extruded strand comprising crystallizable resin. Preferably, the heating is applied to the strand in the course of its manufacture, namely immediately after the extrusion step and before the extruded strands are cut into pellets (pelletized). While the IR treatment may alternatively be applied to the composition after it has been pelletized, it is clearly more practical to apply IR to the just-extruded strand. The extent and duration of the application of IR radiation may be determined in each instance by considering the resin or the resinous content of the composition, the type of extrusion and IR equipment, the intensity of radiation, the rate of heating, the rate of speed of the strand through the IR emitters as well as the size of the strand. Ultimately, the extent and duration of the IR application is that degree which will cause the resin to become sufficiently crystalline to render it, in pellet form, practically non-sticking. The term "practically non-sticking" refers in the present context to the pellets of the resin modified in accordance with the invention and means that the pellets do not stick one to another to a degree that will impede their flowability.

The molding compositions suitable in the practice of the present invention comprise a crystallizable thermoplastic resin whose maximum drying temperature is higher than its glass transition temperature. Both the amorphous and the semi-crystalline versions of the crystallizable resin are suitable. Although pellets of these resins are typically transparent or translucent, this is not a critical property of the suitable resins. Polyamides, polyesters, polyacetals and polyphenylene sulfides are included among the suitable resins. The process of the invention is applicable to strands of the pure resin as well as to extruded strands containing the resinous component and additional components, including other resins and commonly used additives. An additional embodiment of the invention entails preparing a thermoplastic molding composition comprising extruding a strand of a suitable composition, pelletizing, heating the resulting pellets by means of IR to bring about the crystallization as discussed above and cooling the thus treated pellets.

In the course of the process of the invention, IR heating is applied for a relatively short time, about 5–60, preferably 15 to 40 seconds to a continuously extruding strand. The heating is typically to a temperature between the glass transition of the polymer and the polymer's crystalline melting temperature. For PET, the ideal temperature, the temperature at which maximum rate of crystallization will occur is about 135° C. The IR heating is best applied sufficiently immediate to the point of exit of the strand from the extruder where the strand is still at a substantially high temperature and before significant heat has been lost. Suitable infra-red heating equipment is available in commerce. In the course of the experiments leading to the present invention, use was made of an apparatus made by Process Therma Dynamics (Protherm) which contained 8 model #CB1212-24/3-20 Protherm Series CB electric infra-red heaters (@2880 Watts), one steel mesh conveyor and power controls. There were 4 heaters positioned below and 4 above the conveyor. Different IR heaters will have different throughput capacities depending on the number of heaters and their positioning relative to the moving strand.

After the IR treatment, the change in the crystalline content of the pellet may, as in the case of PET, be determined by measuring the enthalpy of cold crystallization using differential scanning calorimetry (DSC). This determination is useful in adjusting the IR treatment to obtain optimum degree of crystallization. The degree of crystallization is that which will render the molding composition, in pellet form, practically non-sticking.

The invention has been demonstrated using commercial IR equipment and applied to PET strands and to a resinous blend containing PET and polycarbonate. In the experiments, the power controls were set to give a sample temperature of 135° C. after 20 seconds of infra-red heating. After the treatment, the change in the amorphous content of the sample was determined by measuring the enthalpy of cold crystallization. This enthalpy is a measure of the energy required to crystallize the amorphous portion of the PET present in the sample.

|  | enthalpy of cold crystallization (Joule/gram) |
| --- | --- |
| untreated PET pellet | 21.79 |
| IR treated pellet | 3.72 |
| untreated PET/PC pellet | 2.80 |
| IR treated pellet | 0.02 |

Clearly, the process of the invention reduced the content of the amorphous material in the pellet and in accordance with the invention made the thus treated pellet more suitable for high temperature pre-molding drying.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for imparting improved flowability to dried pellets of a thermoplastic molding composition comprising in sequence (i) extruding said composition to form a strand, (ii) heating said strand by exposure to infra-red radiation, and (iii) cutting the strand to form pellets, said composition comprising a crystallizable resin, said heating being at least to that extent sufficient to impart to said composition in dried, pellet-form, improved flowability.

2. The process of claim 1 wherein said heating is to a temperature between the glass transition and the crystalline melting temperature of the resin.

3. The process of claim 1 wherein said resin is selected from the group consisting of polyamides, polyesters, polyacetals and polyphenylene sulfides.

4. The process of claim 1 wherein said heating is carried out in about 5–60 seconds.

5. The process of claim 1 wherein said heating is carried out in about 15 to 40 seconds.

6. A process for imparting improved flowability to dried pellets of a thermoplastic molding composition comprising in sequence (i) extruding said composition to form a strand, (ii) heating said strand by exposure to infra-red radiation, and (iii) cutting said strand to form pellets, said composition comprising a crystallizable resin selected from the group consisting of polyamides, polyesters, polyacetals and polyphenylene sulfides, said heating being for a duration of about 5 to 60 seconds to a temperature between the glass transition and the crystalline melting temperature of the resin.

7. In the process of extruding a strand of a thermoplastic molding composition containing a crystallizable resin the improvement comprising rapidly heating said strand by means of infra-red radiation to a temperature between the glass transition and the crystalline melting temperature of the resin.

8. The process of claim 7 wherein said heating is for a time duration of about 5 to 60 seconds.

9. The process of claim 7 wherein said resin is selected from the group consisting of polyamides, polyesters, polyacetals and polyphenylene sulfides.

10. In the process of preparing a thermoplastic molding composition containing a crystallizable resin selected from the group consisting of polyamides, polyesters, polyacetals and polyphenylene sulfides the improvement comprising extruding said resin to form a strand and heating said strand for about 5 to 60 seconds by exposure to infra-red radiation to a temperature between the glass transition and the crystalline melting temperature of the resin.

11. A process for making a thermoplastic molding composition comprising in sequence (i) extruding said composition to form a strand containing a crystallizable resin, (ii) cutting said strand to form pellets, and (iii) heating said pellets by exposure to infra-red radiation said composition comprising a crystallizable resin, said heating being at least sufficient to impart to said composition in dried, pellet-form, improved flowability.

12. The molding composition prepared by the process of claim 1.

13. The molding composition prepared by the process of claim 6.

14. The molding composition prepared by the process of claim 11.

* * * * *